(12) United States Patent
Shibagaki (10) Patent No.: US 8,376,623 B2
(45) Date of Patent: Feb. 19, 2013

(54) BEARING LUBRICATING STRUCTURE FOR ROTATING SHAFT

(75) Inventor: Daisuke Shibagaki, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 22 days.

(21) Appl. No.: 12/992,213

(22) PCT Filed: Mar. 9, 2009

(86) PCT No.: PCT/JP2009/054471
§ 371 (c)(1),
(2), (4) Date: Nov. 11, 2010

(87) PCT Pub. No.: WO2009/139217
PCT Pub. Date: Nov. 19, 2009

(65) Prior Publication Data
US 2011/0064344 A1    Mar. 17, 2011

(30) Foreign Application Priority Data

May 12, 2008   (JP) ................................. 2008-125222

(51) Int. Cl.
*F16C 19/00* (2006.01)
*F16C 3/14* (2006.01)
(52) U.S. Cl. .......................... 384/462; 384/473; 384/606
(58) Field of Classification Search .................. 384/461, 384/462, 465, 473–474, 548, 571, 586, 589, 384/606, 608, 618
See application file for complete search history.

(56) References Cited

U.S. PATENT DOCUMENTS

| 2,272,757 A | * | 2/1942 | Tcker | 384/466 |
| 4,227,427 A | * | 10/1980 | Dick | 74/467 |
| 4,824,264 A | * | 4/1989 | Hoebel | 384/473 |

(Continued)

FOREIGN PATENT DOCUMENTS

| DE | 3008636 A1 | 9/1980 |
| DE | 3705607 A1 | 9/1988 |

(Continued)

OTHER PUBLICATIONS

German Office Action issued Apr. 12, 2012 for corresponding Application No. 112009001115.2.

*Primary Examiner* — Marcus Charles
(74) *Attorney, Agent, or Firm* — Sughrue Mion, PLLC (57) ABSTRACT

A bearing lubricating structure for a rotating shaft includes: a pair of bearings that are disposed spaced-apart in an axial direction within a support case, for rotatably supporting the predetermined rotating shaft around an axis thereof; and an oil supply port that is disposed on the support case, for supplying lubricating oil for lubricating the pair of bearings to between the pair of bearings, between the pair of bearings and between the oil supply port and the rotating shaft, a separator being disposed in the axial direction, for receiving the lubricating oil supplied from the oil supply port to prevent the lubricating oil from directly adhering to the rotating shaft, the separator being integrally fixed to the support case, and the separator having at its axially opposite ends thereof a pair of sidewalls confronting the pair of bearings and projecting from the opposite ends toward an inner circumferential surface of the support case to be in intimate contact with the inner circumferential surface, and the pair of sidewalls each including a communication hole that permits the lubricating oil supplied from the oil supply port to flow toward the pair of bearings at a predetermined flow rate.

3 Claims, 4 Drawing Sheets

U.S. PATENT DOCUMENTS

| | | | | |
|---|---|---|---|---|
| 5,328,275 A * | 7/1994 | Winn et al. | | 384/472 |
| 5,711,738 A * | 1/1998 | Abe et al. | | 384/571 |
| 5,803,616 A * | 9/1998 | Persson et al. | | 384/473 |
| 6,293,704 B1* | 9/2001 | Gradu | | 384/557 |
| 6,854,892 B2* | 2/2005 | Lauck et al. | | 384/462 |
| 7,036,989 B2* | 5/2006 | Taki et al. | | 384/462 |
| 7,044,643 B2* | 5/2006 | Greubel | | 384/462 |
| 7,500,311 B2* | 3/2009 | Shimomura | | 29/898.1 |
| 2003/0108261 A1* | 6/2003 | Yokota et al. | | 384/474 |
| 2004/0213494 A1* | 10/2004 | Shimomura | | 384/473 |
| 2008/0096715 A1* | 4/2008 | Ono | | 384/462 |

FOREIGN PATENT DOCUMENTS

| | | | |
|---|---|---|---|
| JP | 56-160352 U | | 11/1981 |
| JP | 60-147898 U | | 10/1985 |
| JP | 61-011057 U | | 1/1986 |
| JP | 63-150160 U | | 10/1988 |
| JP | 1-65454 U | | 4/1989 |
| JP | 2006-329257 A | | 12/2006 |
| JP | 2007-315456 A | | 12/2007 |
| JP | 2009174682 A | * | 8/2009 |

* cited by examiner

AMOUNT OF OIL PASSING THROUGH BEARING
(WHEN BEARING IS ISOLATED)

FIG.4(b)

AMOUNT OF OIL PASSING THROUGH BEARING
(WHEN BEARING SUPPORTS DRIVE PINION)

BEARING LUBRICATING STRUCTURE FOR ROTATING SHAFT

CROSS REFERENCE TO RELATED APPLICATIONS

This application is a National Stage of International Application No. PCT/JP2009/054471 filed Mar. 9, 2009, claiming priority based on Japanese Patent Application No. 2008-125222 filed May 12, 2008, the contents of all of which are incorporated herein by reference in their entirety.

TECHNICAL FIELD

The present invention relates to a bearing lubricating structure for a rotating shaft, and, more particularly, to a technique of suppressing a loss in power transmission efficiency caused by a power loss of the rotating shaft attributable to viscous resistance and shear resistance of lubricating oil which occur e.g., when the lubricating oil adheres directly to the rotation shaft or when an excessive amount of the lubricating oil is supplied to bearings.

BACKGROUND ART

A lubricating structure for rotating-shaft bearings is known that includes (a) a pair of bearings arranged in an axially spaced-apart relationship within a support case for rotatably supporting a predetermined rotating shaft around its axis; and (b) an oil supply port disposed on the support case for supplying lubricating oil for lubricating the pair of bearings to between the pair of bearings. One example of such a structure is disclosed in Patent Documents 1 and 2 which describe a lubricating structure for bearings that rotatably support a drive pinion transmitting rotation from a propeller shaft to a ring gear of a differential mechanism around an axis thereof, wherein lubricating oil splashed by the ring gear is led to the oil supply port to flow into an annular space surrounded by the pair of bearings on the outer circumferential side of a shaft of the drive pinion, to axially penetrate the bearings on both sides to be discharged to the outside, thereby lubricating and cooling the bearings.

Patent Document 1: Japanese Laid-Open Patent Publication No. 2007-315456
Patent Document 2: Japanese Laid-Open Patent Publication No. 2006-329257

BRIEF SUMMARY OF THE INVENTION

Problems to be Solved by the Invention

Such a conventional lubricating structure for rotating-shaft bearings, however, has a problem that the lubricating oil supplied from the oil supply port to between the pair of bearings may adhere directly to the outer circumferential surface of the rotating shaft or of a member (such as a spacer) rotated integrally with the rotating shaft to be entrained or stirred up thereby, whereupon the rotating shaft may experience a power loss due to viscous resistance, shear resistance, etc. of the lubricating oil caused by the stirring-up thereof, giving rise to a loss in the power transmission efficiency. Furthermore, when the lubricating oil fed to the oil supply port is supplied intactly to the bearings for use in lubrication and cooling, an excessive amount of the lubricating oil exceeding the amount required for the lubrication and cooling may pass through the bearings, as a result of which the power loss increases due to the viscous resistance, shear resistance, etc. of the lubricating oil, resulting in an impaired power transmission efficiency. In case of tapered roller bearings for example, the lubricating oil is sucked by the bearings for the discharge to the exterior under the pumping action that occurs based on the difference in the radial dimension of tapered rollers. The amount of oil passing through the bearings under the pumping action depends on the number of revolutions, while the amount of lubricating oil required for the lubrication and cooling also increases in accordance with the increase in the number of revolutions. However, since the increasing rate of the amount of oil passing through is larger than that of the amount of oil required, a larger amount of lubricating oil than required is caused to pass through the bearings, esp., at high revolutions, so that a substantial power loss may occur due to the viscous resistance, etc. of the lubricating oil.

The present invention was conceived in view of the circumstances described above as background. It is therefore the object of the present invention to suppress a loss in power transmission efficiency caused by a power loss of a rotating shaft attributable to viscous resistance and shear resistance of lubricating oil which occur e.g., when the lubricating oil adheres directly to the rotation shaft and when an excessive amount of the lubricating oil is supplied to bearings.

Means for Solving the Problems

To achieve the object, the present invention comprising:(a) a pair of bearings that are disposed spaced-apart in an axial direction within a support case, for rotatably supporting a predetermined rotating shaft around an axis thereof; and(b) an oil supply port that is disposed on the support case, for supplying lubricating oil for lubricating the pair of bearings to between the pair of bearings, (c) between the pair of bearings and between the oil supply port and the rotating shaft, a separator being disposed in the axial direction, for receiving the lubricating oil supplied from the oil supply port to prevent the lubricating oil from directly adhering to the rotating shaft, the separator being integrally fixed to the support case, and, (d) the separator having at its axially opposite ends thereof a pair of sidewalls confronting the pair of bearings and projecting from the opposite ends toward an inner circumferential surface of the support case to be in intimate contact with the inner circumferential surface, and (e) the pair of sidewalls each including a communication hole that permits the lubricating oil supplied from the oil supply port to flow toward the pair of bearings at a predetermined flow rate.

The second invention in the bearing lubricating structure for a rotating shaft of the first invention, wherein (a) the separator includes: a cylindrical oil receiving portion disposed substantially concentrically with the rotating shaft on an outer circumferential side of the rotating shaft; and a pair of annular sidewalls confronting the pair of bearings and extending from opposite ends of the oil receiving portion toward an outer circumferential side to be in intimate contact with a cylindrical inner circumferential surface of the support case, and (b) wherein the communication hole disposed on each of the pair of sidewalls is each of a plurality of communication holes arranged at equiangular intervals around a centerline of the oil receiving portion.

Effect of the Invention

In such bearing lubricating structure for a rotating shaft, the separator is disposed at the pair of bearings and the lubricating oil supplied from the oil supply port is received by the separator, thereby reducing the power loss caused by the entrainment or stirring-up as a result of direct adhesion of the lubricating oil to a rotating shaft or to a member, (spacer etc.) that rotates integrally with the rotating shaft. The lubricating oil received by the separator is supplied at a predetermined flow rate through the communication holes of the sidewalls disposed on the opposite ends of the separator toward the pair of bearings for use in the lubrication and cooling the bearing, thereby suppressing the occurrence of a substantial power loss due to the viscous resistance, shear resistance, etc. caused by the excessive supply of lubricating oil to the bearings. That is, by receiving the lubricating oil supplied from the oil supply port by the separator to prevent the oil from directly adhering to the rotating shaft etc, while simultaneously properly setting the position, the number, and the size of the communication holes disposed on the sidewalls, a possibly small amount of the lubricating oil is directly supplied from the separator to the bearings while assuring a minimum amount of the lubricating oil required for the lubrication and cooling, to thereby achieve a reduction in the power loss of the rotating shaft attributable to the viscous resistance, etc. of the lubricating oil and to improve the power transmission efficiency.

The separator of the second invention is configured to include the cylindrical oil receiving portion disposed on the outer circumferential side of the rotating shaft substantially concentrically therewith; and the pair of annular sidewalls confronting the pair of bearings respectively and extending from the opposite ends of the oil receiving portion toward the outer circumferential side so as to be in intimate contact with the cylindrical inner circumferential surface of the support case, with the pair of sidewalls being provided with a plurality of communication holes respectively positioned at equiangular intervals around the centerline of the oil receiving portion, whereupon the separator 46 can be simply assembled integrally into the support case at any phase by press-fitting etc, without need to consider the phase around the centerline when assembled into the support case.

BRIEF DESCRIPTION OF DRAWINGS

FIG. 3 depicts, in an isolated manner, a separator of FIG. 2 in an upper half view above a centerline S, (a) being a left side view, (b) being a sectional view taken parallel to the center line S, and (c) being a right side view.

FIG. 4 is a diagram for explaining a relationship between the amount of oil passing through a bearing of FIG. 2 and the number of revolutions, (a) depicting a case of the bearing isolated, and (b) depicting a difference depending on the presence or absence of the separator in case of supporting a drive pinion as in FIG. 2.

FIG. 5 is a diagram for explaining another embodiment of the present invention, depicting the separator in an isolated manner similar to FIG. 3, (a) being a left side view, (b) being a sectional view taken parallel to the center line S, and (c) being a right side view.

BEST MODES FOR CARRYING OUT THE INVENTION

A bearing lubricating structure for a rotating shaft of the present invention is preferably applied to a lubricating structure for bearings that rotatably support around an axis a drive pinion (small gear) transmitting rotation from a propeller shaft of a vehicle to a ring gear (large gear) of a differential mechanism. It may, however, be applied to a bearing lubricating structure for a rotating shaft disposed at other portions of a vehicle power transmission path, or to a bearing lubricating structure for various types of rotating shafts other than the vehicle use.

It is desirable that with the rotating shaft disposed in a substantially horizontal posture, the oil supply port be positioned vertically above the rotating shaft such that lubricating oil flows down by gravity to be supplied to between a pair of bearings. But instead, the oil supply port may be positioned diagonally above, or a plurality of the oil supply ports may be provided. In a case where the lubricating oil has a predetermined flow velocity as a result of being splashed by the gear for example, the oil supply port may be positioned laterally substantially level with the rotating shaft so that the lubricating oil is supplied laterally into the support case.

Although supply of the lubricating oil to the oil supply port can be performed using the splashing by the ring gear of the differential mechanism for example or using the splashing by the other gears, etc., it may be achieved by various forms including providing a predetermined oil supply passage such as a communication passage.

The pair of bearings for supporting a rotating shaft can be various types of bearings such as tapered roller bearings, cylindrical roller bearings, or ball bearings depending on the type of the rotating shaft. In case of using the tapered roller bearings, the lubricating oil is sucked by the bearings for the discharge to the exterior under the pumping action that occurs based on the difference in the radial dimension of tapered rollers. The amount of oil passing through the bearings under the pumping action depends on the number of revolutions, while the amount of lubricating oil required for the lubrication and cooling also increases in accordance with the increase in the number of revolutions. In general, however, the increasing rate of the amount of oil passing through is larger than that of the amount of oil required, with the result that at high revolutions a larger amount of lubricating oil than required is caused to pass through the bearings, so that a substantial power loss may occur due to the viscous resistance, etc. of the lubricating oil. Therefore, the position, the number, and the size of communication holes disposed in sidewalls of a separator are properly set so that a possible small amount of lubricating oil is supplied from the separator into the bearings while assuring a minimum amount of lubricating oil required for the lubrication and cooling, thereby suppressing the occurrence of a large power loss due to the viscous resistance, etc. of the lubricating oil. It is possible to individually set the position to supply the lubricating oil and the amount of supply for each of the bearings, by separately setting the size of the sidewalls, and the position, the number, and the size of the communication holes depending on the radial dimension, etc. of the bearings on both sides. The sidewalls on both sides may be of the same size and may be provided respectively with communication holes of the same size at the same position.

The bearings other than the tapered roller bearings do not especially experience an operation of sucking the lubricating oil by the pumping action, but, are lubricated and cooled by the lubricating oil supplied through the communication holes of the separator. Accordingly, similar to the case of the tapered roller bearings, by properly setting the position, the number, and the size of the communication holes to restrict the amount of oil to be supplied so that the bearings are supplied with a possible small amount of lubricating oil while assuring a minimum amount of lubricating oil required for the lubrication and cooling, it is possible to suppress a power loss due to the viscous resistance, etc. of the lubricating oil, and to individually set the position of supply and the amount of oil to be supplied for each of the pair of bearings. Double row ball bearings also have an operation of sucking the lubricating oil by the pumping action similar to the tapered roller bearings.

It is desirable that the position of the communication holes, i.e., the position to supply the lubricating oil to the bearings, is to be set to the non-rotative side having a relatively small power loss caused by the viscous resistance, shear resistance, etc. attendant on the supply of lubricating oil, i.e., to the outer ring side integrally fixed to the support case. Specifically, it is desirable to set the position of the communication holes so that the lubricating oil is supplied to a portion between a retainer retaining a rolling element and an outer ring. It is to be noted that the lubricating oil may be supplied to the rotation side, i.e., to the inner ring side.

As in a second aspect of the present invention, the separator preferably includes a cylindrical oil receiving portion positioned substantially concentrically with the rotating shaft on the outer circumferential side of the rotating shaft, and a pair of annular sidewalls extending respectively from opposite ends of the oil receiving portion toward the outer circumferential side thereof to be in intimate contact with the cylindrical inner circumferential surface of the support case such that an annular cylindrical oil reservoir is defined by the separator and the inner circumferential surface of the support case. Alternatively, the separator may include for example a semi-cylindrical oil receiving portion covering and surrounding only the upper half of the rotating shaft, a pair of semi-annular sidewalls in the shape of fans extending respectively from the axially opposite ends of the oil receiving portion toward the outer circumferential side thereof to be intimate contact with the inner circumferential surface of the support case, and a pair of flat plate-shaped blocking portions extending respectively from opposite side edges of the oil receiving portion toward the outer circumferential side thereof to be in intimate contact with the inner circumferential surface of the support case such that a semi-annular cylindrical oil reservoir is defined by the separator and the inner circumferential surfaces of the support case. The angular range of the separator around the axis of the rotating shaft may include any angles other than the full circumference or the semicircumference as describe above and may be in various forms. To sum up, it is sufficient that the lubricating oil supplied from the oil supply port is received by the separator so as to prevent it from adhering directly to the rotating shaft, etc. and that the lubricating oil is directly supplied to the bearings at a predetermined flow rate from the communication holes disposed on the sidewalls while storing the lubricating oil within the oil reservoir of the annular cylindrical shape, etc. defined between the separator and the support case.

Although the separator can be integrally formed by e.g., pressing a metal cylinder, flat plate, etc., it may be in various forms. For example, the oil receiving portion of the cylindrical shape, etc. and the sidewalls may be separately formed to thereafter be firmly integrally joined together by welding, etc.

The separator can be conveniently installed by press-fitting so that the outer circumferential portions of the sidewalls are in an intimate contact with the cylindrical inner circumferential surface of the support case and thereafter the separator is integrally fixed with the support case. However, various forms may also be available such as integrally fixing by use of bolts or other fastening means, welding, etc. or such as undetachably assembling by use of snap rings, etc. To easily and stably obtain a predetermined fixing strength in case of press-fitting into the cylindrical inner circumferential surface of the support case, a pair of cylindrical or semicylindrical folded-back portions having a predetermined length may be provided by deep-drawing, etc. so as to axially inwardly extend closer to each other from the outer circumferential edges of the opposite sidewalls so that, upon press-fitting, the folded-back portions come into intimate contact with the support case.

The communication holes disposed on the sidewalls are preferably in the form of circular holes, but instead the communication holes having various shapes such as an elliptical or oval shape, a square shape, and a slit-like shape may be employed. While a plurality of the communication holes are arranged for example at equiangular intervals around a centerline of an arc of cylinder, semicylinder, etc. of the oil receiving portion of the separator, they may be provided at non-equiangular intervals. The communication holes disposed on the opposite sidewalls may differ in the number, the size, the shape, the interval, etc.

DETAILED DESCRIPTION OF THE INVENTION

An embodiment of the present invention will now be described in detail with reference to the drawings.

Figure 1:
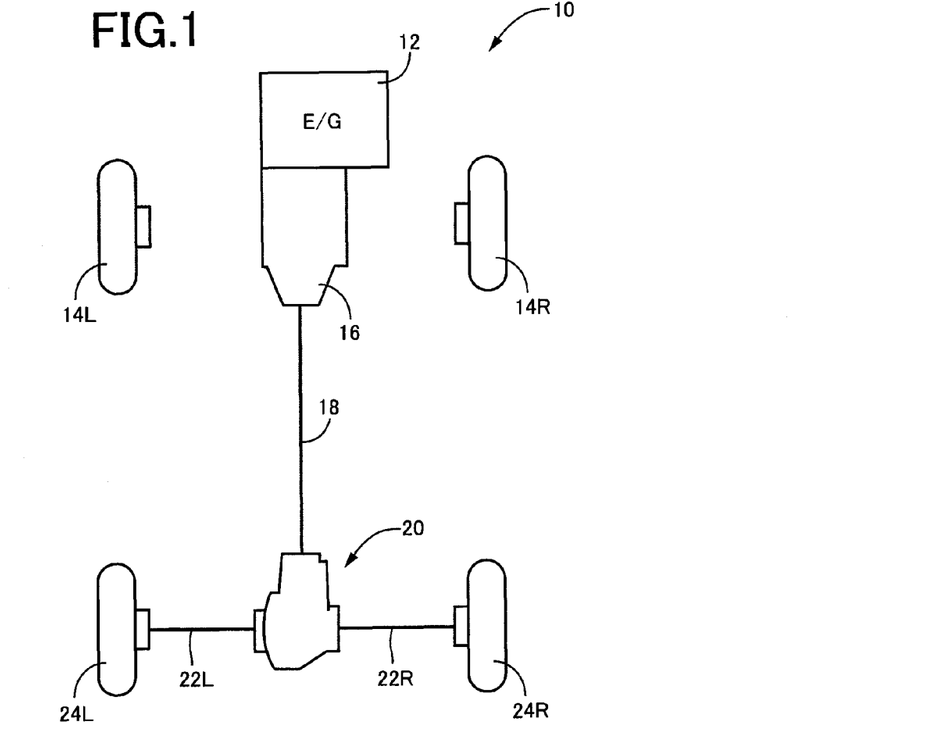
FIG. 1 is a schematic view for explaining a power transmission system of an FR vehicle having a bearing lubricating system to which the present invention is applied.

FIG. 1 is a diagram for explaining a power transmission mechanism of a vehicle 10 of front-engine rear-wheel drive (FR) type having a final reduction gear 20 provided with a bearing lubricating structure to which the present invention is applied. Referring to FIG. 1, the vehicle 10 includes an engine 12 serving as a power source; a pair of, left and right front wheels 14L and 14R; an automatic transmission 16 for changing the speed of an output rotation of the engine 12; a propeller shaft 18 for transmitting a driving force output from an output shaft of the automatic transmission 16; the final reduction gear 20 functioning as a rear-wheel driving force distributer; a pair of, left and right rear-wheel axles 22L and 22R for transmitting the driving force distributed by the final reduction gear 20; and a pair of, left and right rear wheels 24L and 24R to which the driving force is transmitted via the rear-wheel axles 22L and 22R, respectively.

Figure 2:
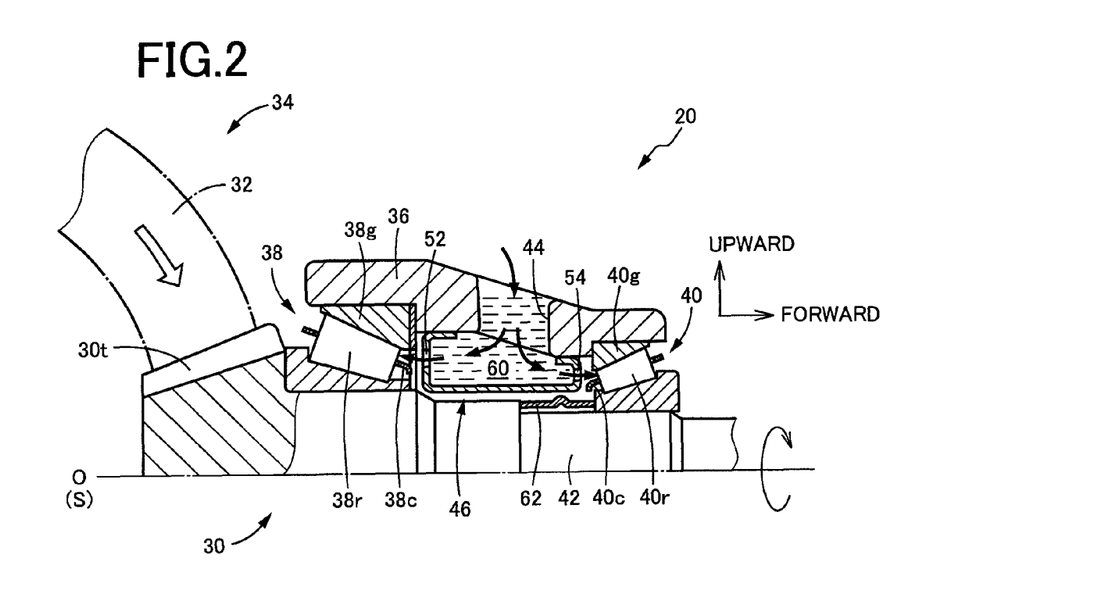
FIG. 2 is a sectional view of a bearing lubricating structure for a drive pinion to which the present invention is applied in a final reduction gear of the power transmission system of FIG. 1.

FIG. 2 is a partially sectional view of the final reduction gear 20 which includes a drive pinion 30 integrally coupled to the propeller shaft 18 for being rotationally driven around an axis O; and a differential mechanism 34 having a ring gear 32 meshing with and rotationally driven by meshing teeth (e.g., hypoid gear) 30t of the drive pinion 30, the differential mechanism 34 serving to distribute the power to the left and right rear-wheel axles 22L and 22R. The drive pinion 30 corresponds to the predetermined rotating shaft and is disposed rotatably around the axis O via a pair of bearings 38 and 40 within a support case 36 in a substantially horizontal posture with the axis O becoming a longitudinal direction of the vehicle. The support case 36 is integrally fitted to the frame, etc. of a vehicle body via a differential housing not shown. The drive pinion 30 and the bearing structure are configured symmetrically around the axis O. In FIG. 2, the lower half below the axis O is not shown.

The pair of bearings 38 and 40 are tapered roller bearings having tapered rollers 38r and 40r, respectively, and are arranged in an axially spaced-apart relationship within the support case 36 to rotatably support a stepped shaft 42 of the drive pinion 30 at axially spaced-apart two points thereof. The bearings 38 and 40 are both arranged in such a posture that the large-diameter sides of the tapered rollers 38r and 40r become the axially outer sides respectively. The bearing 38 closer to the meshing teeth 30t of the drive pinion 30 is larger in diameter than the bearing 40 on the other hand, and the tapered roller 38*r* is larger in pitch diameter than the tapered roller 40*r*.

To lubricate these bearings 38 and 40, a single oil supply port 44 is disposed on the support case 36 at a position immediately above the axis O in the vertical direction and between the bearings 38 and 40 in the axial direction of the drive pinion 30 so that part of lubricating oil splashed by rotation of the ring gear 32 is led into the oil supply port 44. Between the pair of the bearings 38 and 40, a cylindrical separator 46 for receiving the lubricating oil supplied from the oil supply port 44 is disposed integrally with the support case 36 and substantially concentrically with the axis O.

Figure 3A:
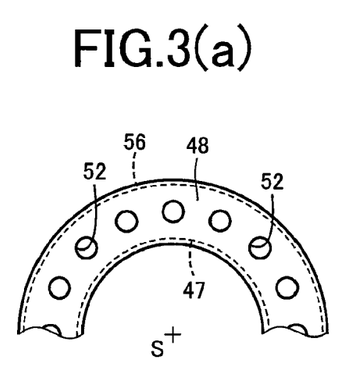
Figure 3B:
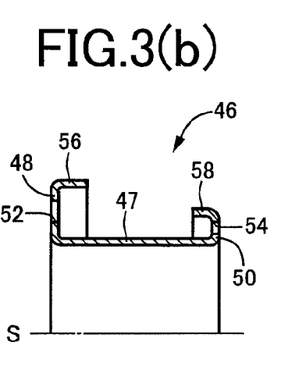
Figure 3C:
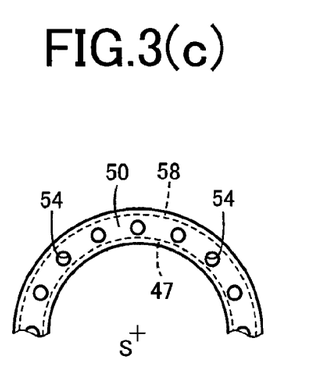

FIG. 3 depicts the separator 46 in an isolated manner. The separator 46 integrally includes a cylindrical oil receiving portion 47 positioned on the outer circumferential side of the stepped shaft 42 of the drive pinion 30 and substantially concentrically with the stepped shaft 42; and a pair of annular sidewalls 48 and 50 extending from the axially opposite ends of the oil receiving portion 47 toward the outer circumferential side at substantially right angles to the centerline S to be in intimate contact with the cylindrical inner circumferential surface of the support case 36 and confront the pair of bearings 38 and 40, respectively. An annular cylindrical oil reservoir 60 is defined by the separator 46 and the inner circumferential surface of the support case 36. The pair of sidewalls 48 and 50 are provided with a plurality of communication holes 52 and 54, respectively. The lubricating oil supplied from the oil supply port 44 is stored in the oil reservoir 60 and is caused to flow out at a predetermined flow rate through the communication holes 52 and 54 toward the bearings 38 and 40, respectively. The separator 46 has an axial length substantially equal to a spaced-apart dimension between the pair of bearings 38 and 40, and the sidewalls 48 and 50 are positioned in proximity to the ends of the bearings 38 and 40, respectively, so that the lubricating oil flowing out of the communication holes 52 and 54 is advantageously applied to the rolling elements, i.e., tapered rollers 38*r* and 40*r* of the bearings 38 and 40. Bold arrows of FIG. 2 represent flows of the lubricating oil supplied to the oil supply port 44 and then applied via the oil reservoir 60 to the pair of bearings 38 and 40. FIG. 3 (a) to (c) each depict an upper half of the separator 46 above the centerline S (substantially coinciding with the axis O when assembled into the support case 36), (a) being a left side view viewed from the direction of the sidewall 48, (b) being a sectional view taken parallel to the centerline S corresponding to FIG. 2, and (c) being a right side view viewed from the direction of the sidewall 50.

Figure 4A:
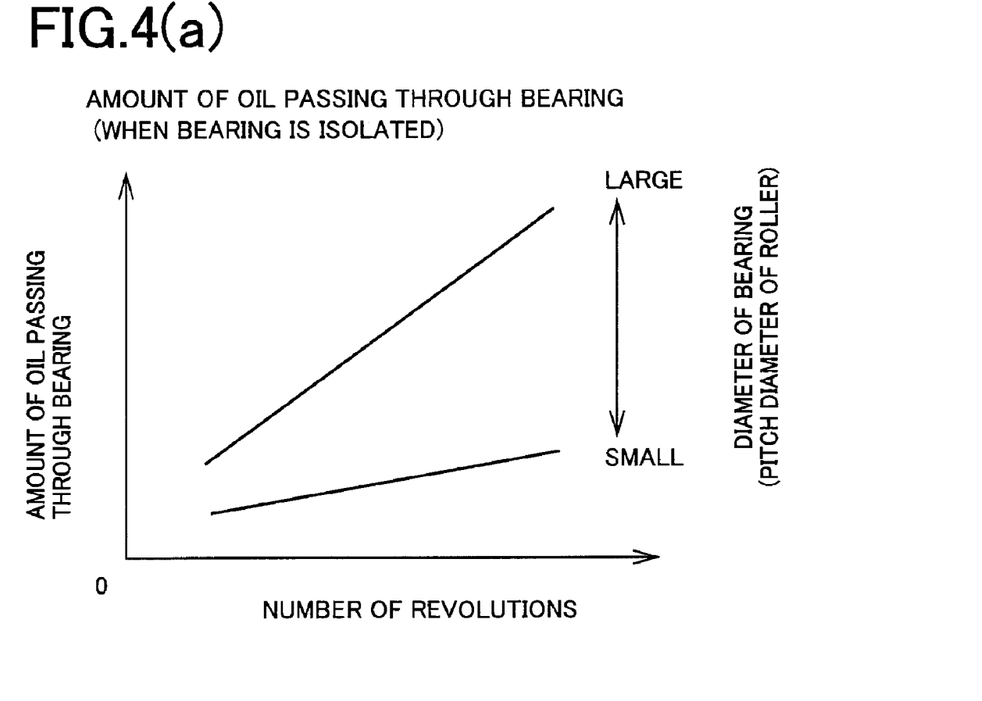

In case of the bearings 38 and 40 provided as the tapered roller bearings, the lubricating oil is sucked by the bearings 38 and 40 for the discharge to the exterior under the pumping action caused by the difference in the radial dimension of the tapered rollers 38*r* and 40*r*. The amount of oil passing through the bearings 38 and 40 under this pumping action depends on the number of revolutions such that it increases as the number of revolutions increases and that it increases as the radial dimension becomes larger as depicted in FIG. 4 (*a*). FIG. 4 (*a*) represents the amount of oil passing through in a case where a sufficient amount of lubricating oil is supplied to the small-diameter side of the tapered rollers 38*r* and 40*r*, i.e., in a case where the small-diameter side is dipped in the lubricating oil. On the other hand, the amount of oil required for the lubrication and cooling also increases as the number of revolutions increases. In general, however, the increasing rate of the amount of oil passing through exceeds that of the amount of oil required, so that a larger amount of the lubricating oil than required is caused to pass through the bearings 38 and 40 in high revolutions, bringing about a substantial power loss due to the viscous resistance, the shear resistance, etc. of the lubricating oil if an amount of supplied oil is not restricted.

In this embodiment, by contrast, the separator 46 having the cylindrical oil receiving portion 47 and the pair of sidewalls 48 and 50 is disposed to restrict the amount of lubricating oil supplied to the bearings 38 and 40, so that the occurrence of a substantial power loss due to the viscous resistance, etc. of the lubricating oil can be suppressed by properly setting the position, the number, the size of the communication holes 52 and 54 disposed on the sidewalls 48 and 50 so that a possibly small amount of the lubricating oil is supplied from the separator 46 to the bearings 38 and 40 while assuring a minimum amount of the lubricating oil required for the lubrication and the cooling. Since the amount of oil required for the lubrication and the cooling differs depending on the radial dimension of the bearings 38 and 40, the size of the sidewalls 48 and 50 and the position, the number, the size, etc. of the communication holes 52 and 54 are separately set depending on the radial dimension of the bearings 38 and 40 so as to assure an optimum position to supply the lubricating oil and an optimum amount of supply thereof for the bearings 38 and 40. Specifically, the communication hole 52 of the sidewall 48 closer to the bearing 38 having a larger radial diameter that requires more lubricating oil is made larger in the radial diameter than the communication hole 54 on the opposite side. When the position of the communication holes 52 and 54, i.e., the position to supply the lubricating oil to the bearings 38 and 40 is set, the radial diameter of the separator 46 is thus defined so that the lubricating oil is supplied to the non-rotative side having a relatively small power loss due to the viscous resistance, shear resistance, etc. caused by the supply of the lubricating oil, i.e., sides of outer rings 38*g* and 40*g* respectively, which are integrally fixed to the support case 36, more specifically, to the outer circumferential side of retainers 38*c* and 40*c*. Further, the outer diameter of the sidewall 48 set to be larger than that of the opposite sidewall 50 and the communication holes 52 lie on the outer circumferential side of the communication holes 54.

Figure 4B:
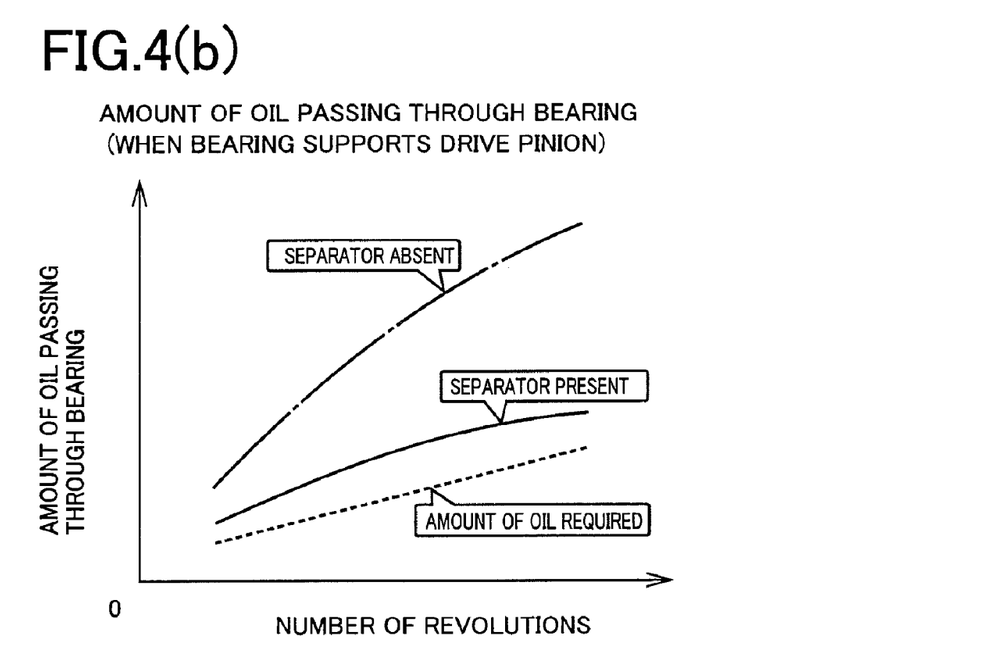

FIG. 4 (*b*) is a diagram for explaining the total amount of oil passing through the opposed bearings 38 and 40, in which a dashed dotted line represents a conventional case of not having the separator 46 where a large amount of excessive lubricating oil is caused to flow at, esp., high-revolution side in comparison with the amount of oil required represented by a broken line, whereas in this embodiment having the separator 46, the amount of supply is restricted by the communication holes 52 and 54, with the result that the amount of oil passing through becomes smaller as indicated by a solid line and that the power loss due to the viscous resistance, etc. of the lubricating oil is reduced at, esp., high-revolution side. Although at the high revolutions, more lubricating oil is supplied to the oil supply port 44 by splashing of the ring gear 32, surplus lubricating oil remaining as a result of restriction of supply by the communication holes 52 and 54 flows down along the outside of the support case 36 by overflowing from the oil supply port 44. The graphs depicted in FIGS. 4 (*a*) and (*b*) are all created to present conceptual comparison and are not based on the actually measured values.

In this embodiment, as is apparent from FIG. 3, the communication holes 52 and 54 are all provided as circular holes and a plurality of the communication holes are arranged at equiangular intervals on a circumference around the centerline S. The separator 46 of this embodiment is integrally formed by press-bending or deep-drawing a metal cylinder or flat plate for example so as to have a pair of folded-back portions 56 and 58 with a predetermined length extending from the outer circumferential edges of the opposed sidewalls 48 and 50, respectively, in parallel to the centerline S toward the inside coming closer to each other. The separator 46 is press-fitted into the support case 36 in such a manner that the folded-back portions 56 and 58 are in intimate contact with the cylindrical inner circumferential surface of the support case 36, so that the separator 46 can be simply fixed to the support case 36 and a predetermined fixing strength can be easily and stably obtained.

Thus, in the bearing lubricating structure for the drive pinion 30 of this embodiment, the cylindrical separator 46 is disposed between the pair of bearings 38 and 40 substantially concentrically with the drive pinion 30 and the lubricating oil supplied from the oil supply port 44 is received by the oil receiving portion 47 of the separator 46, thereby reducing the power loss caused by the entrainment or stirring-up as a result of direct adhesion of the lubricating oil to the stepped shaft 42 of the drive pinion 30 and/or to a spacer 62, etc. that rotates integrally with the stepped shaft 42. The lubricating oil received by the oil receiving portion 47 of the separator 46 is stored in the oil reservoir 60 and is supplied at a predetermined flow rate through the communication holes 52 and 54 disposed on the opposed sidewalls 48 and 50 toward the pair of bearings 38 and 40 for use in the lubrication and cooling the bearing 38 and 40, thereby suppressing the occurrence of a substantial power loss due to the viscous resistance, shear resistance, etc. caused by the excessive supply of lubricating oil to the bearings 38 and 40. That is, by receiving the lubricating oil supplied from the oil supply port 44 by the separator 46 to prevent the oil from directly adhering to the stepped shaft 42, etc, of the drive pinion 30 while simultaneously properly setting the position, the number, and the size of the communication holes 52 and 54 disposed on the sidewalls 48 and 50, a possibly small amount of the lubricating oil is directly supplied from the separator 46 to the bearings 38 and 40 while assuring a minimum amount of the lubricating oil required for the lubrication and cooling, to thereby achieve a reduction in the power loss of the drive pinion 30 attributable to the viscous resistance, etc. of the lubricating oil and to improve the power transmission efficiency.

The separator 46 of this embodiment is configured to include the cylindrical oil receiving portion 47 disposed on the outer circumferential side of the stepped shaft 42 of the drive pinion 30 substantially concentrically therewith; and the pair of annular sidewalls 48 and 50 confronting the pair of bearings 38 and 40 respectively and extending from the opposite ends of the oil receiving portion 47 toward the outer circumferential side so as to be in intimate contact with the cylindrical inner circumferential surface of the support case 36, with the pair of sidewalls 48 and 50 being provided with a plurality of communication holes 52 and 54 respectively positioned at equiangular intervals around the centerline S of the oil receiving portion 47, whereupon the separator 46 can be simply assembled integrally into the support case 36 at any phase by press-fitting without need to consider the phase around the centerline S when assembled into the support case 36.

In this embodiment, the size of the sidewalls 48 and 50 and the position, the number, the size, etc. of the communication holes 52 and 54 are separately set so as to optimize the position to supply the lubricating oil and the amount of supply thereof for each of the bearings 38 and 40 depending on the radial dimension of the opposed bearings 38 and 40, whereupon a proper amount of the lubricating oil is supplied to a proper position of supply irrespective of the difference in the radial dimension of the bearings 38 and 40.

Figure 5A:
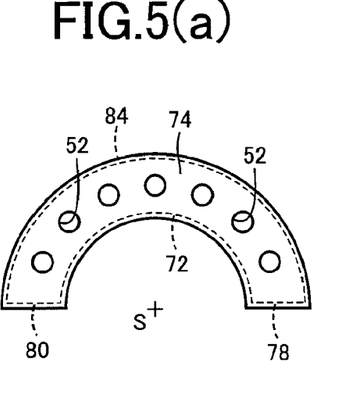
Figure 5B:
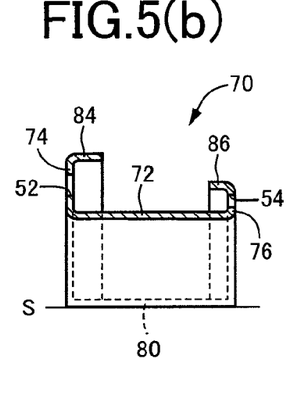
Figure 5C:
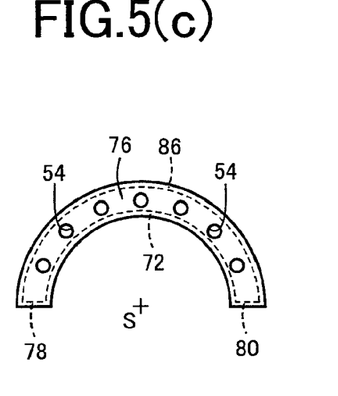

Although the embodiment employs the annular separator 46 disposed on the outer circumferential side of the stepped shaft 42 of the drive pinion 30 substantially concentrically therewith so as to surround the full circumference thereof, it may be configured as a separator 70 depicted in FIG. 5 that includes a semicylindrical oil receiving portion 72 covering only the upper half of the stepped shaft 42; a pair of semi-annular sidewalls 74 and 76 in the shape of a fan extending from axially opposite ends of the oil receiving portion 72 toward the outer circumferential side to be in intimate contact with the inner circumferential surface of the support case 36; and a pair of flat-plate-shaped blocking portions 78 and 80 extending from opposite side edges of the oil receiving portion 72 to be in intimate contact with the inner circumferential surface of the support case 36, wherein a semi-annular cylindrical oil reservoir is defined by the separator 70 and the inner circumferential surface of the support case 36. It is desired in this case as well that a pair of semicylindrical folded-back portions 84 and 86 having a predetermined length be disposed so as to extend from the outer circumferential edges of the opposite sidewalls 74 and 76 in parallel to the centerline S toward the inside coming closer to each other. Although FIG. 5 is a diagram corresponding to FIG. 3, FIG. 5 is a diagram of the whole of the separator 70, with (a) being a left side view, (b) being a sectional view taken parallel to the centerline S, and (c) being a right side view, whereas FIG. 3 is a diagram of the upper half above the centerline S.

Although the present invention has heretofore been set forth in detail, it is to be understood that this is merely one embodiment and that it may be carried out in variously altered or modified forms based on the knowledge of those skilled in the art.

The invention claimed is:

1. A bearing lubricating structure for a rotating shaft, comprising:
  a pair of bearings that are disposed spaced-apart in an axial direction within a support case, for rotatably supporting the predetermined rotating shaft around an axis thereof; and
  an oil supply port that is disposed on the support case, for supplying lubricating oil to between the pair of bearings;
  between the pair of bearings and between the oil supply port and the rotating shaft, a separator being disposed in the axial direction, having an oil receiving portion in a predetermined angular range of the separator around the axis of the rotating shaft for receiving the lubricating oil supplied from the oil supply port so as to prevent the lubricating oil from directly adhering to the rotating shaft, the separator being integrally fixed to the support case, and
  a pair of sidewalls confronting the pair of bearings and projecting from axially opposite ends of the oil receiving portion and toward an inner circumferential surface of the support case to be in intimate contact with the inner circumferential surface, so that an oil reservoir is formed between the oil receiving portion, the pair of sidewalls and the inner circumferential surface, and
  the pair of sidewalls each including a communication hole that permits the lubricating oil supplied from the oil supply port to the oil reservoir to flow toward the pair of bearings at a predetermined flow rate.

2. The bearing lubricating structure for a rotating shaft of claim 1, wherein
  the oil receiving portion is a cylindrical shape surrounding a full circumference around the axis of the rotating shaft and is disposed substantially concentrically with the rotating shaft on an outer circumferential side of the rotating shaft; and the pair of sidewalls extend from the axially opposite ends of the oil receiving portion toward an outer circumferential side to form an annular shape and to be in intimate contact with the inner circumferential surface, having a cylindrical shape so that a hollow cylindrical oil reservoir is formed between the separator and the inner circumferential surface, and wherein the communication hole disposed on each of the pair of sidewalls is each of a plurality of communication holes arranged at equiangular intervals around a centerline of the oil receiving portion.

3. The bearing lubricating structure for a rotating shaft of claim 1, wherein the pair of sidewalls have a pair of folded back portions which are in contact with the inner circumferential surface of the support case.

* * * * *